(12) United States Patent
Kotab (10) Patent No.: US 10,976,176 B1
(45) Date of Patent: Apr. 13, 2021

(54) SYSTEM, METHOD, AND COMPUTER PROGRAM PRODUCT FOR SYNCHRONIZING OR TRANSFERRING GLOBAL POSITIONING SATELLITE DEVICE DATA

(76) Inventor: Dominic M. Kotab, San Jose, CA (US)

( * ) Notice: Subject to any disclaimer, the term of this patent is extended or adjusted under 35 U.S.C. 154(b) by 1174 days.

(21) Appl. No.: 12/607,880

(22) Filed: Oct. 28, 2009

Related U.S. Application Data (60) Provisional application No. 61/109,457, filed on Oct. 29, 2008.

(51) Int. Cl.
   *G01C 21/36* (2006.01)

(52) U.S. Cl.
   CPC ..... *G01C 21/3661* (2013.01); *G01C 21/3629* (2013.01)

(58) Field of Classification Search
   CPC ........ G01C 21/26; G01C 21/36; G01C 21/00; G01C 21/3611; G08G 1/096827
   USPC .......................................................... 701/211
   See application file for complete search history.

(56) References Cited

U.S. PATENT DOCUMENTS

| | | | | |
|---|---|---|---|---|
| 5,951,620 | A * | 9/1999 | Ahrens | G01C 21/26 701/450 |
| 7,552,009 | B2 * | 6/2009 | Nelson | G01C 21/362 701/36 |
| 8,180,379 | B2 * | 5/2012 | Forstall | G01C 21/12 455/41.2 |
| 8,204,683 | B2 * | 6/2012 | McQuaide, Jr. | 701/431 |
| 2007/0073480 | A1 * | 3/2007 | Singh | 701/211 |
| 2008/0021633 | A1 * | 1/2008 | Naito et al. | 701/200 |
| 2008/0046174 | A1 * | 2/2008 | Johnson | G01C 21/28 701/533 |
| 2008/0284647 | A1 * | 11/2008 | Oren et al. | 342/357.09 |
| 2009/0219200 | A1 * | 9/2009 | Tryding et al. | 342/357.09 |
| 2011/0045839 | A1 * | 2/2011 | Chao | 455/456.1 |

FOREIGN PATENT DOCUMENTS

| | | | |
|---|---|---|---|
| JP | 6243395 | * | 9/1994 |
| JP | 06243395 A | * | 9/1994 |

OTHER PUBLICATIONS

Garmin Owner's Manual nuvi 700 Series Personal travel assistant, Published on Sep. 2007 and retreived from: http://www8.garmin.com/manuals/nuvi750-GPS-Atl_OwnersManual.pdf.*

Cnet Reviews, Garmin Nuvi 750, conducted on Mar. 5, 2008 and retrieved from: http://web.archive/org/web/20080506022606/http://reviews.cnet.com/gps-systems/.*

* cited by examiner

*Primary Examiner* — Maceeh Anwari
(74) *Attorney, Agent, or Firm* — Zilka-Kotab, P.C.

(57) ABSTRACT

A method for synchronizing geographic data according to one embodiment includes sending a request to a mobile GPS unit to transmit geographic data. In addition, the method includes receiving geographic data from the mobile GPS unit. Further, the method includes integrating the received geographic data with previously stored data. Also, the method includes using the integrated geographic data to produce a geographic solution. Additionally, the method includes outputting the geographic solution. Other systems, methods, and computer program products are also included.

37 Claims, 7 Drawing Sheets

SYSTEM, METHOD, AND COMPUTER PROGRAM PRODUCT FOR SYNCHRONIZING OR TRANSFERRING GLOBAL POSITIONING SATELLITE DEVICE DATA

RELATED APPLICATIONS

This application claims priority to U.S. provisional patent application No. 61/109,457, filed Oct. 29, 2008, and which is herein incorporated by reference.

FIELD OF THE INVENTION

The present invention relates to synchronizing and/or transferring Global Positioning Satellite (GPS) device information, and more particularly, to synchronizing and/or transferring data stored in one GPS unit to a another GPS unit.

BRIEF DESCRIPTION OF THE DRAWINGS

For a fuller understanding of the nature and advantages of the present invention, as well as illustrative modes of use, reference should be made to the following detailed description read in conjunction with the accompanying drawings.

Various embodiments of the present invention are described in further detail below with reference to the figures, in which like items are numbered the same in the several figures.

DETAILED DESCRIPTION

The following paragraphs describe certain features and combinations of features that can be used in connection with each of the methods of the invention and embodiments, as generally described below. Also, particular features described hereinafter can be used in combination with other described features in each of the various possible combinations and permutations. As such, the invention is not limited to the specifically described embodiments.

Unless otherwise specifically defined herein, all terms are to be given their broadest possible interpretation and scope including one or more meanings implied from the specification as well as one or more meanings understood by those skilled in the art and/or as defined in dictionaries, treatises, etc.

The following description is made for the purpose of illustrating the general principles of the present invention and is not meant to limit the inventive concepts claimed herein. Further, particular features described herein can be used in combination with other described features in each of the various possible combinations and permutations.

It must also be noted that, as used in the specification and the appended claims, the singular forms "a," "an" and "the" include plural referents unless otherwise specified.

According to one general embodiment, a method for synchronizing or transferring geographic data includes sending a request to a mobile GPS unit to transmit geographic data. In addition, the method includes receiving geographic data from the mobile GPS unit. Further, the method includes integrating the received geographic data with previously stored data. Also, the method includes using the integrated geographic data to produce a geographic solution. Additionally, the method includes outputting the geographic solution.

In another general embodiment, a method includes receiving a request to synchronize data with a vehicle mounted GPS system; transmitting geographic data to the vehicle mounted GPS system; and waiting to receive a confirmation indicating that the transmission was successful, whereas if the confirmation is not received before a predetermined time period passes, retransmitting the geographic data to the vehicle mounted GPS system.

In another general embodiment, a system comprises a processor; a computer usable medium, the computer usable medium having computer usable program code embodied therewith, which when executed by the processor causes the processor to: send a request to transmit geographic data from a mobile GAS unit; receive the geographic data from a mobile UPS unit; integrate the received geographic data with previously stored data; use the integrated geographic data to produce a geographic solution; and output a geographic solution.

In another general embodiment, a computer program product for manipulating geographic data comprises a computer usable medium having computer usable program code embodied therewith, the computer usable program code comprising: computer usable program code configured to send a request to transmit geographic data from a mobile GPS unit; computer usable program code configured to receive the geographic data from a mobile UPS unit; computer usable program code configured to integrate the received geographic data with previously stored data; computer usable program code configured to use the integrated geographic data to produce a geographic solution; and computer usable program code configured to output the geographic solution.

In another general embodiment, a method comprises sending a request to synchronize geographic data with a vehicle mounted GPS system; receiving a confirmation to synchronize geographic data from the vehicle mounted GPS system; receiving geographic data from the vehicle mounted GPS system; transmitting geographic data to the vehicle mounted GPS system; and waiting to receive a confirmation indicating that the synchronization was successful, whereas if the confirmation is not received before a predetermined time period passes, resending the request to synchronize data with the vehicle mounted GPS system.

In another general embodiment, a method comprises receiving geographic data from a mobile GPS unit; using the received geographic data to produce a geographic solution; and outputting the geographic solution.

In yet another general embodiment, a method comprises establishing a link between a mobile GPS unit and a vehicle mounted GPS system; and transmitting geographic data from the mobile GPS unit to the vehicle mounted GAS system.

In another general embodiment, a system comprises a processor; a computer usable medium, the computer usable medium having computer usable program code embodied therewith, which when executed by the processor causes the processor to: receive geographic data from a mobile UPS unit; use the received geographic data to produce a geographic solution; and output a geographic solution.

In yet another general embodiment, a computer program product for manipulating geographic data comprises a computer usable medium having computer usable program code embodied therewith, the computer usable program code comprising: computer usable program code configured to receive geographic data from a mobile GPS unit; computer usable program code configured to use the received geographic data to produce a geographic solution; and computer usable program code configured to output the geographic solution.

In another general embodiment, a method includes sending a request to synchronize geographic data with a vehicle mounted GAS system; receiving a confirmation to synchronize geographic data from the vehicle mounted GPS system; receiving geographic data from the vehicle mounted UPS system; and transmitting geographic data to the vehicle mounted GPS system.

Figure 1:
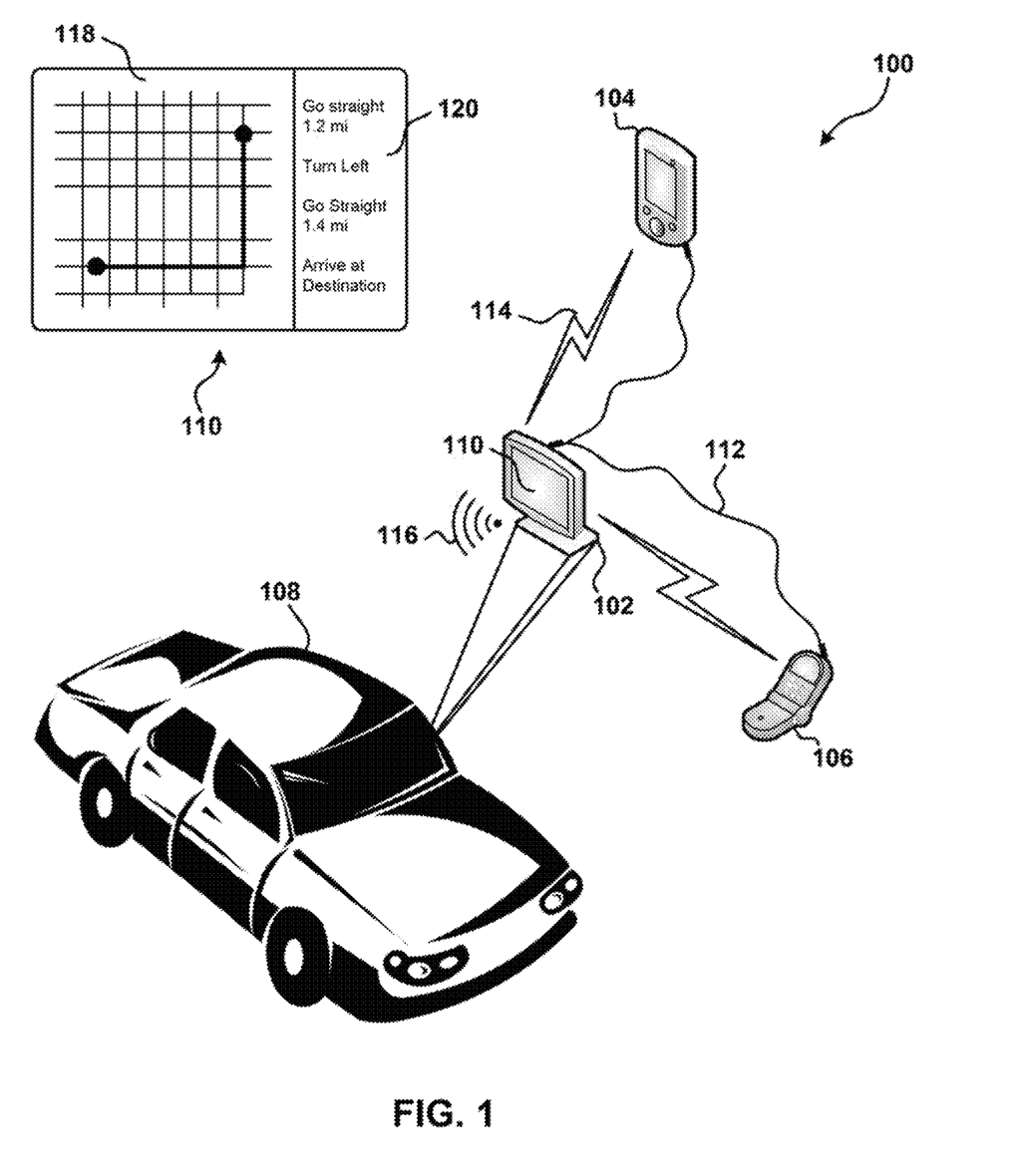
FIG. 1 is a schematic diagram of a system for synchronizing or transferring geographic data according to one embodiment.

FIG. 1 is a schematic diagram of a system 100 according to one embodiment. In FIG. 1, a system may include a vehicle mounted GPS system 102, a handheld GPS unit, a mobile telephone with GPS capability, etc., which may include a display 110 which is capable of visually outputting geographic information and/or textual information. The vehicle 108 in which the GPS system 102 may be mounted might be a car, bus, truck, tractor-trailer, sailing vessel, motorboat, tugboat, freighter, aircraft, helicopter, bicycle, motorcycle, scooter, golf cart, etc. In FIG. 1, the vehicle 108 is depicted as a car, but this in no way limits the scope of the invention or type of vehicle in which the GPS system 102 may be mounted.

The GPS system 102 may be nonremovably coupled to the vehicle 108. For example, the GPS system may be "built in" to the car, as opposed to a device that is detachable from the vehicle. Thus, a nonremovably coupled system may include or use an in-vehicle display screen that is also used for other things. In another approach, the OPS system 102 may include a GPS navigational device adapted for removable mounting on the vehicle 108. In more approaches, the GPS system 102 may include a separate, removable antenna and/or a fixed, nonremovable antenna. If the GPS system 102 includes a separate antenna, the antenna may be fixedly or removably coupled to the vehicle 108, and may be automatically recognized by the GPS system 102 whenever they are placed in electrical communication or within range of each other.

The GPS system 102 may generally include a processor for resolving inputs and/or outputs, computations, and/or various functions normally associated with a processor (e.g., microprocessor, application specific integrated circuit (ASIC), field programmable gate array (FPGA), etc.) in a GPS equipped device. Also, the GPS system 102 may include computer usable medium having computer usable program code embodied therewith. The computer usable medium may be any medium known in the art, such as solid state (e.g., flash) memory, RAM, ROM, CD-ROM, DVD-ROM, BLU-RAY, programmable logic, etc. The computer usable code may, when executed, cause the processor to perform certain tasks. The following tasks are in no way meant to limit the functionality of the system, and additional or less tasks may be performed by the processor in any given embodiment. Further embodiments may include ASICs or other hardware to perform any or all of the features proposed herein. In some approaches, an ASIC may be considered a processor, with or without computer usable program code embodied therewith or accessible thereby.

In some embodiments, the GPS system 102 may send a request to transmit geographic data from a mobile GPS unit, where mobile GPS device and mobile GPS unit are used interchangeably herein. Any type of mobile GPS unit may be requested to transmit data, including GPS equipped mobile devices like mobile phones 106, BLACKBERRY devices 104, PALM devices, APPLE iPHONE devices, laptop computers, tablet computers, personal computers (PCs), GPS navigational devices adapted for removable mounting on a vehicle, etc.

In another approach, the mobile GPS unit may initiate the transfer of geographic data to the GPS system 102. In this approach, the mobile GPS device and the GPS system 102 may be previously linked, linked during the initiation of geographic data transfer, etc.

In some preferred embodiments, the communication between the various devices such as a vehicle mounted GPS system 102 and a mobile GPS unit 104, 106 may be effected via a wireless link, such as BLUETOOTH, WI-FI, RFID protocols, etc. Of course, the request may also be sent over a hardwired connection, such as a USB connection between devices, docking station, serial connection, IEEE 1394 interface (FIREWIRE), etc.

Further, in some embodiments, the GPS system 102 may receive the geographic data from a mobile GPS unit 104, 106. The GPS system 102, which may comprise a processor, may receive the geographic data through standard wired connections such as USB, FIREWIRE, serial connection, etc., or it may receive the geographic data through a wireless link, such as BLUETOOTH, RFID, etc.

In some embodiments, the geographic data may comprise waypoints, destinations, origins, routes, speeds, distances, travel times, favorites such as user-defined locations, etc. Any type of data that may be useful for determining a location and/or calculating travel distances, travel durations, best travel routes, shortest travel routes, fastest travel routes, normal travelling tendencies, etc., may comprise geographic data and may be transmitting to and/or from the mobile OPS unit and the GPS system 102. In one approach, the geographic data is a physical location in the form of geographical coordinates or any other format that is usable by the receiving device. The type of geographical coordinates is not critical. For example, illustrative types of geographical coordinates includes Cartesian coordinates (e.g., longitudinal and latitudinal coordinates), coordinates used by a mapping system or software, an address, coordinates commonly used in present GPS systems, polar coordinates relative to a base point, etc.

In additional embodiments, the GPS system 102 may integrate the received geographic data with previously or coincidently stored data. Previously or coincidently stored data may include present geographic location of the GPS system 102, time, date, travelling speed, geographic region, surrounding waypoints, etc.

In some embodiments, integrating the received geographic data with previously stored data may include choosing only unique geographic data (i.e., geographic data which is different from previously stored geographic data) to receive into the memory of the GPS system 102, such that after the data is received, the two GPS devices (vehicle mounted GPS system and portable GPS unit) may be synchronized, with the vehicle mounted GPS system having all the latest data stored in its memory. Also, a synchronization technique may be used where only unique geographic data is sent from the mobile GPS unit to the GPS system 102, thereby reducing communication time and/or costs to accomplish the synchronization. A further synchronization technique may include transferring data both ways between the devices so that each has at least some common data thereon.

In more approaches, any data that is synchronized between the devices which is not consistent on one device may be requested again from the other device and/or a new request for the data may be sent to a GPS system supplying the GPS information to the devices, such as GPS satellites, repeating towers, etc.

In some embodiments, the integrated geographic data may comprise newly acquired geographic data from the mobile GPS unit. In other embodiments, the integrated geographic data may comprise the newly acquired geographic data and any previously or coincidently stored data, possibly including geographic data and other types of data.

In further approaches, the GPS system 102 may simply receive data of any type from the mobile GPS unit.

In some approaches, the processor may be caused to use the integrated geographic data to produce a geographic solution. A geographic solution may include a route between two or more locations; a map showing a location, destination, origin, etc.; directions to travel from one location to one or more other locations; etc. Also, in some embodiments, the directions may be turn-by-turn directions of the type normally associated with vehicle mounted GPS systems, which may direct a driver to turn at certain intersections, indicate road names, continue driving for certain distances, what kind of travelling time to expect, etc.

In additional approaches, the geographic solution may include estimated travel time, elapsed travel time, average travelling speed, current travelling direction (north, south, east, west, etc.), current travelling speed, remaining travel time, etc.

In some embodiments, the processor may be caused to output a geographic solution. Any type of geographic solution may be output, including but not limited to those types described above. In addition, the output of the geographic solution may be visual 110, verbal or audible 116, or both. For example, a visual output 110 may show a map 118 including a route between two locations, and a verbal output 116 may indicate turn-by-turn directions 120, such as approximate times to turn, when to continue straight, when to stop, etc. In another example, a visual output 110 may show a list of directions, and an audible indicator (e.g., a sound, such as a beep, ding, honk, buzz, etc.) may indicate that a change in direction is indicated by the directions. The audible indicator may change frequency, loudness, etc., to indicate the change in direction is closer.

Note that several illustrative embodiments described herein discuss transfer of information from a mobile OPS device 104, 106 to a GPS system 102 and/or use of such information by a GPS system 102. Such transfer and/or use may also be reversed, i.e., a mobile GPS device 104, 106 may receive and/or use information from a GPS system 102 such as a vehicle-mounted GPS system. Moreover, such transfer and/or use may also be performed between the mobile GPS devices 104, 106, possibly through an interface with the GPS system 102.

Figure 2:
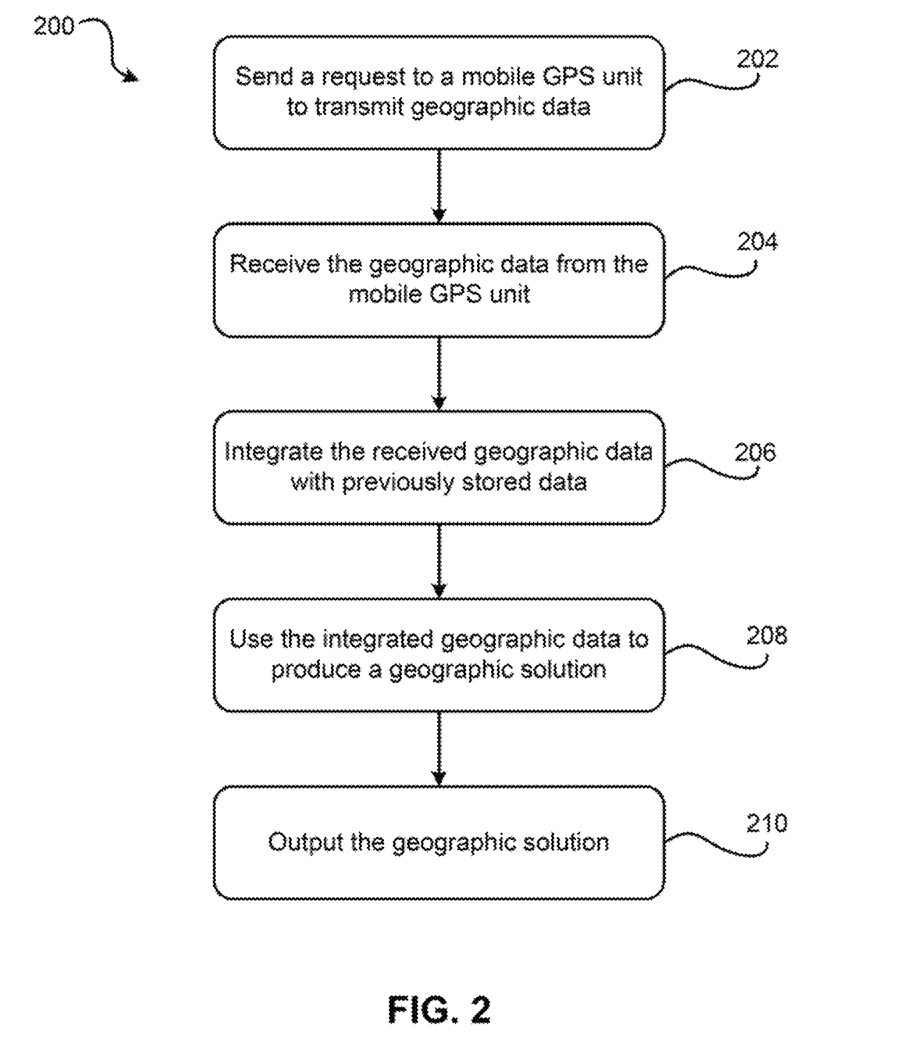
FIG. 2 shows a method according to one embodiment.

Now referring to FIG. 2, a method 200 according to one embodiment is shown. As an option, the method 200 may be implemented in the context of the architecture and environment of FIG. 1. Of course, however, the method 200 may be carried out in any desired environment. The method 200 is generally performed by a GPS equipped device, such as a vehicle mounted GPS system, but this example is for explanatory purposes only and in no way limits the scope of the invention.

With continued reference to FIG. 2, in operation 202, a request is sent to a mobile GPS unit to transmit geographic data. This request may be initiated by a user, by another device, such as a vehicle mounted GPS system, or by any other system capable of producing such a request. For instance, this request may be initiated when a device, such as a vehicle mounted GPS system is powered on, when a car is started, when a certain event happens, after a connection between the devices is established, in response to a request received from the mobile GPS unit, etc. In addition, this request may be transmitted through a wireless link, such as those described above, or may be through a hardwired link, as described above.

In some embodiments, the geographic data may be geographic data, coordinates, directions, etc., as described above.

In operation 204, the geographic data from the mobile GPS unit is received. In some embodiments, only unique geographic data (i.e., geographic data which is different from previously stored geographic data) may be received, such that synchronization may take place within the device which has received the geographic data, such as a vehicle mounted GPS system. In more approaches, any data that is synchronized between the devices which is not consistent on one device may be requested again from the other device and/or a new request for the data may be sent to a GPS system supplying the GPS information to the devices, such as GPS satellites, repeating towers, etc.

In operation 206, the received geographic data is integrated with previously stored data. In some embodiments, there may be no previously stored data, thereby allowing the received geographic data to comprise the memory of the device receiving the data, such as a vehicle mounted GPS system. In other embodiments, the device receiving the geographic data may have data previously stored thereon, such as geographic data and other types of data such as current time, temperature, synchronization data (including device information for data transfers, wireless and hardwired transmission protocols, etc.), management data (database format information, file format information, conversion tools, etc.), etc.

In operation 208, the integrated geographic data is used to produce a geographic solution. The geographic solution may include a route between two or more locations; a map showing a location, destination, origin, waypoint, favorite, etc.; directions to travel from one location to another; etc. The map may be generated from data retrieved from a local computer readable medium, from a remote source e.g., via wired or wireless link, etc.

Also, in some embodiments, the directions may be turn-by-turn directions of the type normally associated with vehicle mounted GPS systems, which may direct a driver to turn at certain intersections or head in a certain direction, continue driving for certain distances, what kind of travelling time to expect, etc. The directions may also be text based, visually based, audibly based, where a user may select to receive the directions in one or more desired forms.

In additional approaches, the geographic solution may include estimated travel time, elapsed travel time, average travelling speed, current travelling direction (north, south, east, west, etc.), current travelling speed, remaining travel time, etc.

In operation 210, the geographic solution is outputted. Any type of geographic solution may be output, including but not limited to those types described above. In addition, the output of the geographic solution may be visual, verbal, or both. For example, a visual output may show a map including a route between two locations, and a verbal output may indicate turn-by-turn directions, such as approximate times to turn, when to continue straight, when to stop, etc.

In another example, a visual output may show a list of directions, and an audible indicator (e.g., a sound, such as a beep, ding, honk, buzz, etc.) may indicate that a change in direction is indicated by the directions. The audible indicator may change frequency, loudness, etc., to indicate the change in direction is closer.

Figure 3:
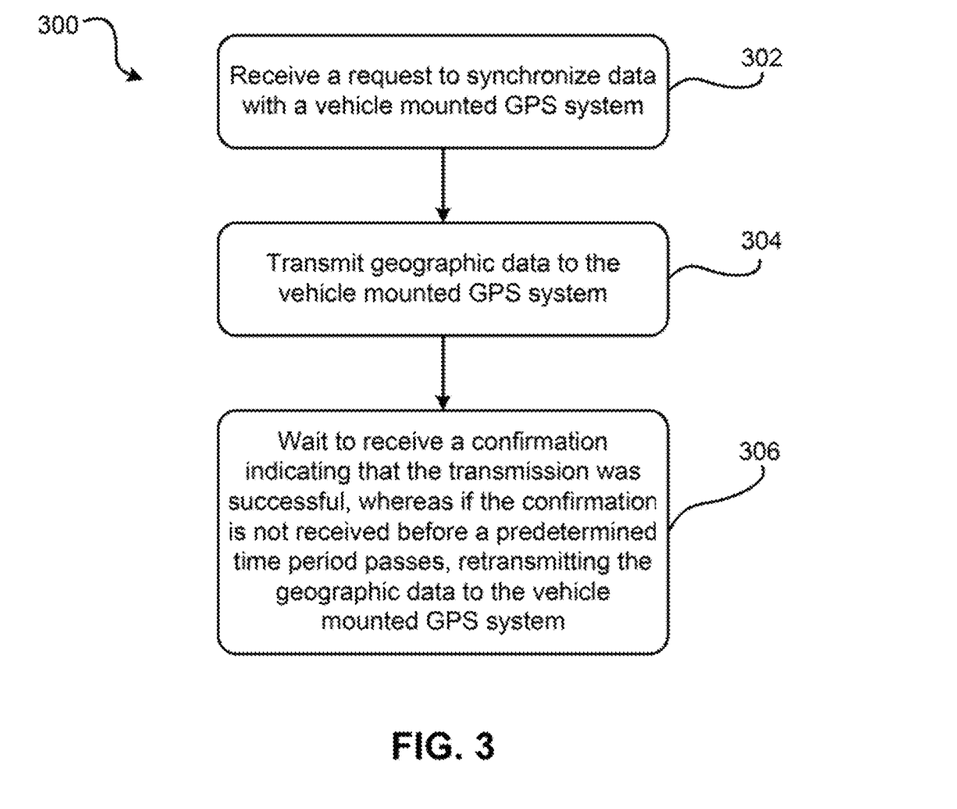
FIG. 3 shows a method according to one embodiment.

Now referring to FIG. 3, a method 300 according to one embodiment is shown. As an option, the method 300 may be implemented in the context of the architecture and environment of FIGS. 1-2. Of course, however, the method 300 may be carried out in any desired environment. The method 300 is generally performed by a GPS equipped device, such as a mobile GPS unit, like a mobile phone, BLACKBERRY, etc., but these examples are for explanatory purposes only and in no way limit the scope of the invention.

With continued reference to FIG. 3, in optional operation 302, a request to synchronize data with a vehicle mounted GPS system is received. This request may be initiated by a user, by another device, such as a mobile GPS unit, or by any other system capable of producing such a request. For instance, this request may be initiated when a device, such as a mobile GPS unit is powered on, when a mobile GPS unit is brought within a certain distance of another GPS equipped device, when a certain event happens, etc. In addition, this request may be transmitted through a wireless link, such as those described above, or may be through a hardwired link, as described above.

In operation 304, geographic data is transmitted to a vehicle mounted GPS system. In some embodiments, the geographic data may be waypoints, destinations, origins, routes, speeds, distances, travel times, favorites, etc. Any type of data that may be useful for calculating travel distances, travel durations, best travel routes, shortest travel routes, fastest travel routes, normal travelling tendencies, etc., may comprise geographic data and may be transmitted to and/or from devices, such as a mobile GPS unit and the vehicle mounted GPS system.

In operation 306, a confirmation indicating that the transmission was successful is waited for, whereas if the confirmation is not received before a predetermined time period passes, the geographic data is retransmitted to the vehicle mounted GPS system. The predetermined time period may be any length of time, including several microseconds up to about a minute or longer. In some embodiments, it may take longer to transmit all the geographic data, and therefore longer waiting periods are possible depending on the circumstances of the individual application.

Figure 4:
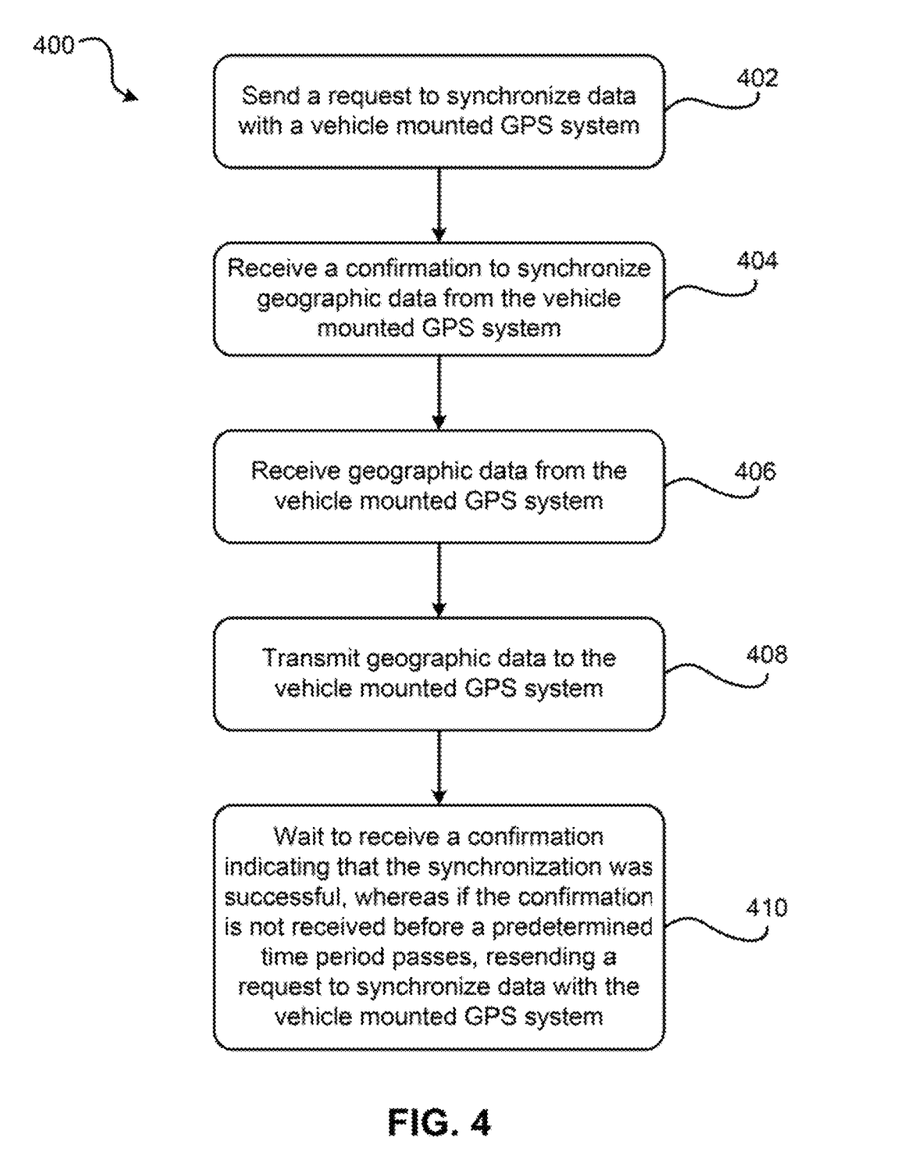
FIG. 4 shows a method according to one embodiment.

Now referring to FIG. 4, a method 400 according to one embodiment is shown. As an option, the method 400 may be implemented in the context of the architecture and environment of FIGS. 1-3. Of course, however, the method 400 may be carried out in any desired environment. The method 400 is generally performed by a GPS equipped device, such as a mobile GPS unit, like a mobile phone, BLACKBERRY, etc., but these examples are for explanatory purposes only and in no way limit the scope of the invention.

With continued reference to FIG. 4, in operation 402, a request to synchronize data with a vehicle mounted GPS system is sent. This request may be initiated by a user, by another device, such as a vehicle mounted GPS system, or by any other system capable of producing such a request. For instance, this request may be initiated when a device, such as a mobile GPS unit is powered on, when a mobile GPS unit is brought within a certain distance of another GPS equipped device, when a certain event happens, etc. In addition, this request may be transmitted through a wireless link, such as those described above, or may be through a hardwired link, as described above.

In operation 404, a confirmation to synchronize geographic data is received from the vehicle mounted GPS system. Any type of geographic data, as described above, may be included in the synchronization. In addition, other types of data that would be helpful in performing tasks by the two GPs equipped devices may be synchronized as well.

In operations 406 and 408, geographic data is communicated between the vehicle mounted GPS system and another device, such as a mobile GPS unit. Once again, additional types of data may be transmitted and/or received in the synchronization, depending on the particular application and circumstances.

In operation 410, a confirmation indicating that the synchronization was successful is waited for, whereas if the confirmation is not received before a predetermined time period passes, the request to synchronize data is resent to the vehicle mounted GPS system. The predetermined time period may be any length of time, including several seconds up to about a minute. In some embodiments, it may take longer to transmit all the geographic data, and therefore longer waiting periods are possible depending on the circumstances of the individual application.

Figure 5:
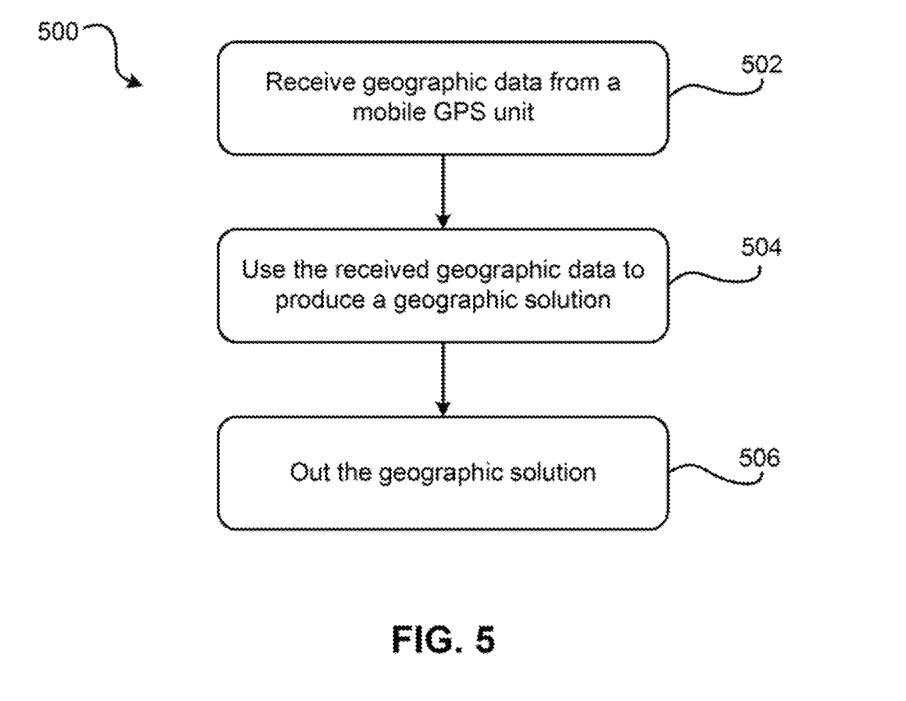
FIG. 5 shows a method according to one embodiment.

Now referring to FIG. 5, a method 500 according to one embodiment is shown. As an option, the method 500 may be implemented in the context of the architecture and environment of FIGS. 1-4. Of course, however, the method 500 may be carried out in any desired environment. The method 500 is generally performed by a GPS equipped device, such as a vehicle mounted GPS system, like a car navigation system, but this example is for explanatory purposes only and in no way limits the scope of the invention.

With continued reference to FIG. 5, in operation 502, geographic data from a mobile GPS unit is received. All of the previous descriptions of geographic data, mobile GPS units, etc., apply to these embodiments.

In operation 504, the received geographic data is used to produce a geographic solution. A geographic solution may be of any of the types previously described.

In operation 506, the geographic solution is output, verbally, visually, or otherwise. In preferred embodiments, the geographic solution may be output both verbally as turn-by-turn directions, and visually as a map or dynamic route. In another example, a visual output may show a list of directions, and an audible indicator (e.g., a sound, such as a beep, ding, honk, buzz, etc.) may indicate that a change in direction is indicated by the directions. The audible indicator may change frequency, loudness, etc., to indicate the change in direction is closer.

Figure 6:
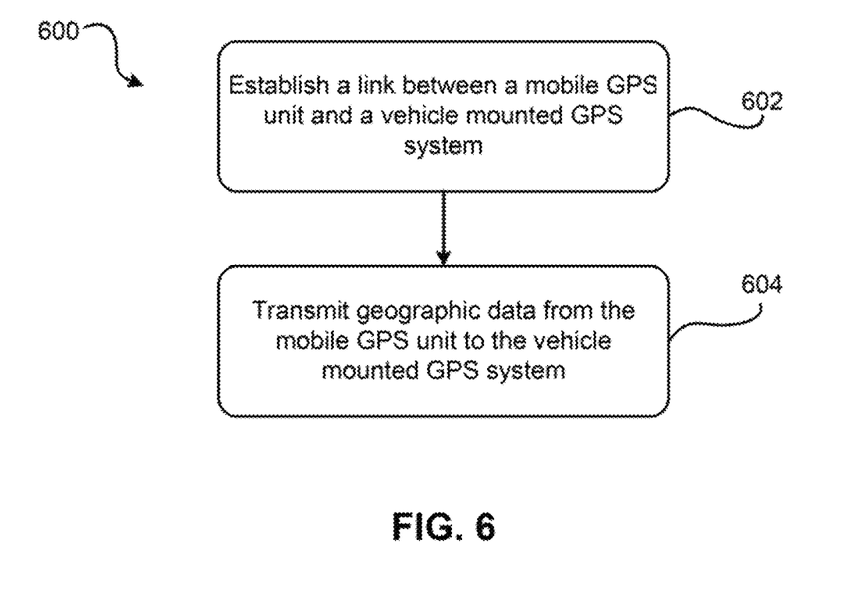
FIG. 6 shows a method according to one embodiment.

Now referring to FIG. 6, a method 600 according to one embodiment is shown. As an option, the method 600 may be implemented in the context of the architecture and environment of FIGS. 1-5. Of course, however, the method 600 may be carried out in any desired environment.

With continued reference to FIG. 6, in operation 602, a link is established between a mobile GPS unit and a vehicle mounted GPS system. In some embodiments, the mobile GPS unit may be a mobile phone, BLACKBERRY device, personal GPS unit, another vehicle mounted GPS system in the same or a different vehicle, etc. The vehicle mounted GPS system may be a car navigation system, an airplane navigation system, a nautical navigation system, etc., and may be permanently mounted in the vehicle, or removable, such as a MAGELLAN navigation system, TOM TOM navigation system, GARMIN navigation system, etc.

In some embodiments, the synchronization and/or transfer of geographic data may be between a mobile GPS unit and a vehicle mounted GPS unit, a mobile GPS unit and a mobile GAS unit, or a vehicle mounted GPS unit and a vehicle mounted GPS unit.

In operation 604, geographic data is transmitted from the mobile GPS unit to the vehicle mounted GPS system. Also, in some embodiments, the vehicle mounted GPS system may transfer and/or synchronize geographic data to the mobile GPS unit.

All of the preceding descriptions of mobile GPS units, vehicle mounted GPS systems, geographic data, hardwired and wireless links, etc., apply to this embodiment.

In addition, the link may be established automatically by either device each time the device is powered on, each time a device is in range of a wireless connection, each time a hardwired connection is established, each time a certain event occurs, such as passage of time, application started, user initiation, etc.

In some embodiments, the mobile GPs unit may wait to receive a confirmation indicating that the transmission was successful, whereas if the confirmation is not received before a predetermined time period passes, the geographic data is retransmitted to the vehicle mounted GPS system. The predetermined time period may be any length of time, including several seconds up to about a minute. In some embodiments, it may take longer to transmit all the geographic data, and therefore longer waiting periods are possible depending on the circumstances of the individual application. Also, an action may terminate the period of time early, such as user input, the device powering down, etc.

Figure 7:
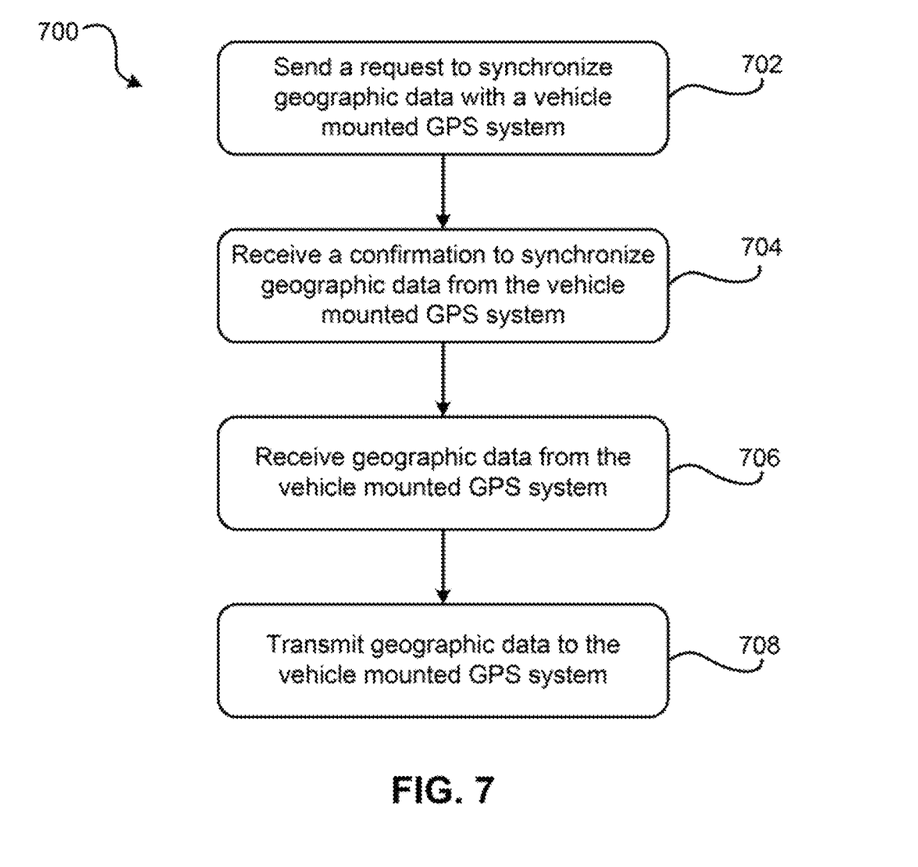
FIG. 7 shows a method according to one embodiment.

Now referring to FIG. 7, a method 700 according to one embodiment is shown. As an option, the method 700 may be implemented in the context of the architecture and environment of FIGS. 1-6. Of course, however, the method 700 may be carried out in any desired environment. The method 700 is generally performed by a GPS equipped device, such as a mobile GPS unit, like a mobile phone, BLACKBERRY, etc., but these examples are for explanatory purposes only and in no way limit the scope of the invention.

With continued reference to FIG. 7, in operation 702, a request to synchronize data with a vehicle mounted GPS system is sent. This request may be initiated by a user, by another device, such as a vehicle mounted GPS system, or by any other system capable of producing such a request. For instance, this request may be initiated when a device, such as a mobile GPS unit is powered on, when a mobile GPS unit is brought within a certain distance of another GPS equipped device, when a certain event happens, etc. In addition, this request may be transmitted through a wireless link, such as those described above, or may be through a hardwired link, as described above.

In operation 704, a confirmation to synchronize geographic data is received from the vehicle mounted GPS system. Any type of geographic data, as described above, may be included in the synchronization. In addition, other types of data that would be helpful in performing tasks by the two GPs equipped devices may be synchronized as well.

In operations 706 and 708, geographic data is communicated between the vehicle mounted GPS system and another device, such as a mobile GPS unit. Once again, additional types of data may be transmitted and/or received in the synchronization, depending on the particular application and circumstances.

In some embodiments, a confirmation indicating that the synchronization was successful may be waited for, whereas if the confirmation is not received before a predetermined time period passes, the request to synchronize data may be resent to the vehicle mounted GPS system. The predetermined time period may be any length of time, including several seconds up to about a minute. In some embodiments, it may take longer to transmit all the geographic data, and therefore longer waiting periods are possible depending on the circumstances of the individual application. Also, an action may terminate the period of time early, such as user input, the device powering down, etc.

In some embodiments, the mobile GPS unit may be a mobile unit that is not equipped with GPS functionality, but is capable of storing and/or transferring geographic and/or GPS data which might be useful for a vehicle mounted GPS system to determine a geographic solution. These devices may have Internet connectivity, such that Internet map applications may be used to select, store, manipulate, etc., geographic data, which can then be transferred and/or synchronized with another mobile GPS unit and/or vehicle mounted GPS system.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

While the present invention has been illustrated and described with reference to specific embodiments, further modification and improvements will occur to those skilled in the art. The present description has thus been presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown or described, but is to be accorded the widest scope consistent with the principles and features disclosed herein.

In particular, various embodiments discussed herein may be implemented using the Internet as a means of communicating among a plurality of computer systems. One skilled in the art will recognize that the present invention is not limited to the use of the Internet as a communication medium and that alternative methods of the invention may accommodate the use of a private intranet, a LAN, a WAN, a PSTN, WI-FI, BLUETOOTH, RFID, or other means of communication. In addition, various combinations of wired, wireless (e.g., radio frequency) and optical communication links may be utilized with any of the embodiments.

The program environment in which a present embodiment of the invention may be executed illustratively incorporates one or more general-purpose computers or special-purpose devices. Special purpose devices may include vehicle mounted GPS systems, mobile GPS units (e.g., a GPS equipped mobile phone, an APPLE iPHONE, a GPS equipped BLACKBERRY, a GPS equipped PALM, etc.). Details of such devices (e.g., processor, memory, data storage, input and output devices) are well known and are omitted for the sake of clarity.

It should also be understood that the techniques presented herein might be implemented using a variety of technologies. For example, the methods described herein may be implemented in software running on a computer system, or implemented in hardware utilizing either a combination of microprocessors or other specially designed application specific integrated circuits, programmable logic devices, or various combinations thereof. In particular, methods described herein may be implemented by a series of computer-executable instructions residing on a storage medium such as a carrier wave, disk drive, or computer-readable medium. Exemplary forms of carrier waves may be electrical, electromagnetic or optical signals conveying digital data streams along a local network or a publicly accessible network such as the Internet. In addition, although specific embodiments of the invention may employ object-oriented software programming concepts, the invention is not so limited and is easily adapted to employ other forms of directing the operation of a computer.

Various embodiments can also be provided in the form of a computer program product comprising a computer readable medium having computer code thereon. A computer readable medium can include any medium capable of storing computer code thereon for use by a computer, including optical media such as read only and writeable CD, DVD, magnetic memory, semiconductor memory (e.g., flash memory and other portable memory cards, etc.), etc. Further, such computer program product can be downloadable or otherwise transferable from one computing device to another via network, wireless link, nonvolatile memory device, etc.

In addition, some or all of the aforementioned embodiments, as stored in code, may be embodied on any computer readable storage media including magnetic tape, flash memory, system memory, hard drive, network memory, etc. Also, a data signal embodied in a carrier wave (e.g., in a network including the Internet) can be the computer readable storage medium. Additionally, some or all of the code may be printed or otherwise visually displayed on an object (e.g., some or all of the code may be displayed on a card, paper, etc.)

While various embodiments have been described above, it should be understood that they have been presented by way of example only, and not limitation. Thus, the breadth and scope of an embodiment should not be limited by any of the above-described exemplary embodiments, but should be defined only in accordance with the following claims and their equivalents.

EXAMPLES

The following examples are for explanatory purposes only, and in no way limit the scope of the invention or the possible embodiments thereof.

In one example, the vehicle mounted GPS system may be a navigational unit in an automobile, such as a factory installed unit or an aftermarket unit. The user of the GPS system may have a portable device, such as a mobile phone, which is equipped with GPS functionality, such that geographic data may be stored in the memory of the mobile phone, such as waypoints, destinations, favorites, routes, etc. Any type of geographic data may be useful when this user drives the automobile. Therefore, in some embodiments, the user might be prompted to synchronize the mobile phone when the car is started or the GPS system is powered on. If the user allows the synchronization, the mobile phone could then transmit geographic data to the GPS system, thereby increasing the stored data on the GPS system, and allowing the user to access the geographic data that is on the mobile device through the vehicle mounted GPS system. The GPS system may then use the new geographic data to calculate geographic solutions, such as turn-by-turn directions from the user's home to a destination, such as a friend's house or store.

In another example, the vehicle mounted GPS system may be on a fishing boat, whereas a user may have a portable GPS device, such as a personal GPS unit. The user may go fishing with a friend and bring along his personal GPS unit, and the fishing trip may be successful prompting the user to want to return to the same location in his own boat sometime in the future. The user could then set a favorite in his personal GPS unit, which could be synchronized with the vehicle mounted GPS system in his fishing boat, causing the vehicle mounted GPS system to now have the favorite fishing spot accessible to direct the user to the same location again to the good fishing area.

In yet another example, a user may be on a business trip in a foreign city, and may come across a destination that he may want to return to again when he has more time on his hands. He could store the destination in his GPS equipped mobile phone as a favorite, and then when he returned to the city sometime in the future, driving a GPS equipped rental car for instance, he could synchronize his mobile phone with the navigational system in the rental car, thereby allowing the user to access the favorite destination from the rental car's navigational system, and may receive turn-by-turn directions on how to return to the desired destination, possibly verbal prompts on when to turn, how far to drive, and which direction to travel.

In a further example, a user may have a mobile phone which does not have GPS functionality, but has access to the Internet. This user may download and/or setup a desired location through an Internet mapping service, such as GOOGLE MAPS, YAHOO! MAPS, etc., which the user may want to transfer to a vehicle mounted GPS system, such as one that might be in an automobile. When the user turned on the automobile, the vehicle mounted GPS system could query all devices within range to determine if any geographic data is available. The mobile phone could then transfer one or more saved locations from the mobile phone to the vehicle mounted GPS system, possibly through a wireless BLUETOOTH connection, thus eliminating the need to reprogram the desired locations on the vehicle mounted GPS system, saving time, effort, and ensuring that the proper locations are stored in the vehicle mounted GPS system. The vehicle mounted GPS system could then output, visually as a map and verbally through turn-by-turn directions, the route to travel to arrive at one or more desired locations from the current location as determined by the vehicle mounted GPS system.

In a different example, two vehicle mounted GPS systems may have different geographic data stored therein. The vehicle mounted GPS systems may be car navigation systems, either factory installed or aftermarket purchased and installed. The cars may be parked next to each other and use a BLUETOOTH connection to transfer and/or synchronize geographic data between the navigation systems in each car. The two navigation systems also may be synchronized and/or transfer geographic data between each other through a hardwired connection, such that all unique geographic data on each device is transferred to the other device, and vice versa. In this way, a user can ensure that each vehicle has the same geographic data accessible from each car's navigation system. Similarly, a detachable navigation system may be taken to another vehicle mounted GPS system, and a synchronization and/or transfer of geographic data may be achieved in this fashion.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method for transferring geographic data, comprising:
establishing a wireless link between a GPS equipped mobile device and a vehicle mounted navigation system;
sending, from the vehicle mounted navigation system, a request for geographic data to the GPS equipped mobile device;
receiving, from the GPS equipped mobile device at the vehicle mounted navigation system, the geographic data, the geographic data including a destination, a route, one or more waypoints, one or more origins, one or more distances, one or more travel times, and one or more user-defined favorites;
integrating, at the vehicle mounted navigation system, the received geographic data including the route with a present geographic location of the vehicle mounted navigation system, a time, a date, a geographic region, and surrounding waypoints;
using the received geographic data by the vehicle mounted navigation system to calculate a geographic solution, the geographic solution including at least a map including the route between a current location of the vehicle mounted navigation system and the destination, and turn-by-turn directions from the current location of the vehicle mounted navigation system to the destination;
outputting the map including the route on a display associated with the vehicle mounted navigation system; and
audibly outputting the turn-by-turn directions via the vehicle mounted navigation system.

2. The method of claim 1, wherein the GPS equipped mobile device is a GPS equipped mobile phone, capable of receiving and processing signals from GPS satellites.

3. The method of claim 1, wherein the geographic data includes a physical location in a form of longitudinal and latitudinal coordinates.

4. The method of claim 1, wherein the geographic solution is a route between at least two locations.

5. The method of claim 1, wherein the geographic data is selected on the GPS equipped mobile device using an application having internet connectivity, and the selected geographic data is transferred to the vehicle mounted navigation system by a wireless link.

6. The method of claim 5, wherein the application is further used to perform at least one of storing or manipulating the geographic data.

7. The method of claim 1, further comprising integrating the received geographic data with additional geographic data previously stored on the vehicle mounted navigation system to create integrated geographic data, where the geographic solution is produced using the integrated geographic data.

8. The method of claim 7, wherein the wireless link includes Wi-FI.

9. The method of claim 1, wherein the request for geographic data is initiated when the vehicle mounted navigation system is brought within a predetermined distance of the GPS equipped mobile device.

10. The method of claim 1, wherein the geographic data is retransmitted to the vehicle mounted navigation system in response to determining that confirmation has not been received before a predetermined time period.

11. A vehicle mounted navigation system, comprising:
a processor;
hardware for processing GPS signals received from satellites, the hardware being coupled to the processor;
a display coupled to the processor, the display being capable of visually outputting geographic information;
a computer usable medium, the computer usable medium having computer usable program code embodied therewith, which when executed by the processor causes the processor to:
establish a wireless link with a GPS equipped mobile device;
send, from the vehicle mounted navigation system to the GPS equipped mobile device, a request for geographic data;
receive, from the GPS equipped mobile device, the geographic data, the geographic data including a destination, a route, one or more waypoints, one or more origins, one or more distances, one or more travel times, and one or more user-defined favorites;
integrate, at the vehicle mounted navigation system, the received geographic data including the route with a present geographic location of the vehicle mounted navigation system, a time, a date, a geographic region, and surrounding waypoints
use the received geographic data by the vehicle mounted navigation system to calculate a geographic solution, the geographic solution including at least a map including the route between a current location of the vehicle mounted navigation system and the destination, and turn-by-turn directions from the current location of the vehicle mounted navigation system to the destination;
output the map including the route on a display associated with the vehicle mounted navigation system; and
audibly output the turn-by-turn directions via the vehicle mounted navigation system.

12. The system of claim 11, wherein the GPS equipped mobile device is a GPS equipped mobile phone capable of receiving and processing signals from GPS satellites.

13. The system of claim 11, wherein the geographical data includes a physical location in a form of longitudinal and latitudinal coordinates.

14. The system of claim 11, wherein the geographic solution is a route between at least two locations.

15. The system of claim 11, wherein the geographic data is selected on the GPS equipped mobile device using an application having internet connectivity, and the selected geographic data is transferred to the vehicle mounted navigation system by the wireless link.

16. The system of claim 15, wherein the application is further used to perform at least one of storing or manipulating the geographic data.

17. The system of claim 11, wherein the wireless link includes Wi-FI.

18. The system of claim 11, wherein the GPS equipped mobile device is located within a vehicle to which the vehicle mounted navigation system is coupled.

19. A computer program product for transferring geographic data, the computer program product comprising:

a non-transitory computer usable medium having computer usable program code embodied therewith, the computer usable program code comprising:
   computer usable program code configured to establish a wireless link between a GPS equipped mobile device and a vehicle mounted navigation system;
   computer usable program code configured to send, from the vehicle mounted navigation system to the GPS equipped mobile device, a request for geographic data;
   computer usable program code configured to cause the vehicle mounted navigation system to receive, from the GPS equipped mobile device, the geographic data, the geographic data including a destination, a route, one or more waypoints, one or more origins, one or more distances, one or more travel times, and one or more user-defined favorites;
   computer usable program code configured to cause the vehicle mounted navigation system to integrate, at the vehicle mounted navigation system, the received geographic data including the route with a present geographic location of the vehicle mounted navigation system, a time, a date, a geographic region, and surrounding waypoints;
   computer usable program code configured to cause the vehicle mounted navigation system to use the received geographic data to calculate a geographic solution, the geographic solution including at least a map including the route between a current location of the vehicle mounted navigation system and the destination, and turn-by-turn directions from the current location of the vehicle mounted navigation system to the destination;
   computer usable program code configured to cause the vehicle mounted navigation system to output the map including the route on a display associated with the vehicle mounted navigation system; and
   computer usable program code configured to cause the vehicle mounted navigation system to audibly output the turn-by-turn directions via the vehicle mounted navigation system.

20. A method, comprising:
establishing a wireless link between a GPS equipped mobile device and a vehicle mounted navigation system;
receiving, at the GPS equipped mobile device from the vehicle mounted navigation system, a request for geographic data; and
in response to the request, sending, from the GPS equipped mobile device to the vehicle mounted navigation system, geographic data, the geographic data including a destination, a route, one or more waypoints, one or more origins, one or more distances, one or more travel times, and one or more user-defined favorites.

21. The method of claim 20, wherein the GPS equipped mobile device is a GPS equipped mobile phone capable of receiving and processing signals from GPS satellites.

22. The method of claim 20, wherein the vehicle mounted navigation system is capable of receiving and processing signals from GPS satellites.

23. The method of claim 20, wherein the geographic data includes a physical location in a form of longitudinal and latitudinal coordinates.

24. The method of claim 20, wherein the geographic data is received at the vehicle mounted navigation system by a wireless link.

25. The method of claim 24, wherein the wireless link includes Wi-FI.

26. The method of claim 20, wherein the request is initiated when the vehicle mounted navigation system is powered on.

27. The method of claim 20, wherein the request is initiated when the GPS equipped mobile device is powered on.

28. The method of claim 20, wherein the geographic data is received through a hardwired link.

29. The method of claim 20, wherein the request is initiated when the GPS equipped mobile device is positioned within a predetermined distance of the vehicle mounted navigation system.

30. The method of claim 20, wherein the request is initiated by a user.

31. The method of claim 20, further comprising sending a confirmation to the GPS equipped mobile device that geographic data was received at the vehicle mounted navigation system.

32. A GPS equipped mobile device, comprising:
a processor;
a non-transitory computer usable medium, the computer usable medium having computer usable program code embodied therewith, which when executed by the processor causes the processor to:
establish a wireless link between the GPS equipped mobile device and a vehicle mounted navigation system;
receive, at the GPS equipped mobile device from the vehicle mounted navigation system, a request for geographic data; and
in response to the request, send, from the GPS equipped mobile device to the vehicle mounted navigation system, geographic data, the geographic data including a destination, a route, one or more waypoints, one or more origins, one or more distances, one or more travel times, and one or more user-defined favorites.

33. The system of claim 32, wherein the GPS equipped mobile device includes a GPS equipped mobile phone.

34. The system of claim 32, wherein the geographic data includes a physical location in a form of longitudinal and latitudinal coordinates.

35. The system of claim 32, wherein the geographic data is received through the wireless link.

36. The system of claim 35, wherein the wireless link includes Wi-FI.

37. A computer program product for synchronizing geographic data, the computer program product comprising:
   a non-transitory computer usable medium having computer usable program code embodied therewith, the computer usable program code comprising:
   computer usable program code configured to cause a GPS equipped mobile device to establish a wireless link to a vehicle mounted navigation system;
   computer usable program code configured to cause a GPS equipped mobile device to receive, at the GPS equipped mobile device from the vehicle mounted navigation system, a request for geographic data; and
   computer usable program code configured to cause the GPS equipped mobile device to send to the vehicle mounted navigation system geographic data in response to the request, the geographic data including a destination, a route, one or more waypoints, one or more origins, one or more distances, one or more travel times, and one or more user-defined favorites.

\* \* \* \* \*